US011949275B2

(12) United States Patent
Chen et al.

(10) Patent No.: US 11,949,275 B2
(45) Date of Patent: Apr. 2, 2024

(54) WIRELESS POWER RECEPTION APPARATUS AND MOBILE TERMINAL (71) Applicant: GUANGDONG OPPO MOBILE TELECOMMUNICATIONS CORP., LTD., Guangdong (CN)

(72) Inventors: Shebiao Chen, Guangdong (CN); Jialiang Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 721 days.

(21) Appl. No.: 17/097,619

(22) Filed: Nov. 13, 2020

(65) Prior Publication Data
US 2021/0066952 A1 Mar. 4, 2021

Related U.S. Application Data (63) Continuation of application No. PCT/CN2018/088492, filed on May 25, 2018.

(51) Int. Cl.
*H02J 7/04* (2006.01)
*H02J 7/00* (2006.01)
(Continued)

(52) U.S. Cl.
CPC ............ *H02J 7/04* (2013.01); *H02J 7/00032* (2020.01); *H02J 50/10* (2016.02); *H02J 50/80* (2016.02); *H02J 2207/20* (2020.01)

(58) Field of Classification Search
CPC .......... H02J 7/04; H02J 7/00032; H02J 50/10; H02J 50/80; H02J 2207/20; H02J 50/12;
(Continued)

(56) References Cited

U.S. PATENT DOCUMENTS 9,419,465 B2 * 8/2016 van Lammeren ....... H02J 50/40
10,804,740 B2 * 10/2020 An ........................ H01F 27/366
(Continued)

FOREIGN PATENT DOCUMENTS

CN 202121330 U 1/2012
CN 103208922 A 7/2013
(Continued)

OTHER PUBLICATIONS

Australian Examination Report for AU Application 2018424390 dated May 12, 2021. (3 pages).
(Continued)

*Primary Examiner* — Nha T Nguyen
(74) *Attorney, Agent, or Firm* — Young Basile Hanlon & MacFarlane, P.C.

(57) ABSTRACT

A wireless power reception apparatus includes a coil, a first rectifying unit, a second rectifying unit, and a charging unit. The coil includes a first end, a second end, and a tap. The coil defined by the first end and the second end is configured to provide a first voltage. The coil defined by the first end and the tap provides a second voltage. The first rectifying unit is coupled with the first end and the second end of the coil, and has a working voltage which matches a first voltage to adapt to a first wireless charging mode. The second rectifying unit is coupled with the first end and the tap of the coil, and has a working voltage which matches a second voltage to adapt to a second wireless charging mode. The charging unit is configured to select the first or second rectifying unit to charge the battery.

16 Claims, 5 Drawing Sheets (51) Int. Cl.
*H02J 50/10* (2016.01)
*H02J 50/80* (2016.01)

(58) Field of Classification Search
CPC . H02J 7/02; H01F 27/29; H01F 38/14; H04B 5/0037
See application file for complete search history.

(56) References Cited

U.S. PATENT DOCUMENTS

| | | | | |
|---|---|---|---|---|
| 11,139,687 | B2* | 10/2021 | Kim | H02J 50/12 |
| 11,394,250 | B2* | 7/2022 | Wan | H02J 7/007182 |
| 11,398,747 | B2* | 7/2022 | Partovi | H01F 38/14 |
| 11,450,963 | B2* | 9/2022 | Do | H01Q 1/24 |
| 11,735,939 | B2* | 8/2023 | Cooper | H02J 7/007 320/160 |
| 2005/0017677 | A1* | 1/2005 | Burton | H02J 50/402 320/108 |
| 2005/0047175 | A1* | 3/2005 | Kawasaki | H02M 3/33592 363/16 |
| 2010/0164295 | A1* | 7/2010 | Ichikawa | H02J 50/12 307/104 |
| 2012/0242164 | A1* | 9/2012 | Teggatz | H01F 21/12 307/104 |
| 2014/0191710 | A1* | 7/2014 | van Lammeren | H02J 50/90 320/108 |
| 2014/0210406 | A1* | 7/2014 | Na | H02J 50/80 320/108 |
| 2015/0035372 | A1 | 2/2015 | Aioanei | |
| 2015/0318710 | A1* | 11/2015 | Lee | H04B 5/0093 307/104 |
| 2015/0340877 | A1* | 11/2015 | Lin | H02J 50/12 307/104 |
| 2016/0164334 | A1* | 6/2016 | Gu | H02J 50/10 320/108 |
| 2016/0322857 | A1* | 11/2016 | Itagaki | H01F 38/14 |
| 2016/0336785 | A1* | 11/2016 | Gao | H04B 5/0037 |
| 2017/0077738 | A1* | 3/2017 | Park | H02J 50/12 |
| 2017/0133889 | A1* | 5/2017 | Yeo | H02J 50/12 |
| 2017/0141585 | A1 | 5/2017 | Walley et al. | |
| 2017/0208158 | A1* | 7/2017 | Kim | H02J 7/0044 |
| 2018/0013309 | A1 | 1/2018 | Winkler et al. | |
| 2019/0190319 | A1* | 6/2019 | Kawamae | H02M 7/46 |
| 2020/0403454 | A1* | 12/2020 | Chen | H02J 50/12 |
| 2020/0412169 | A1* | 12/2020 | Chen | H02J 7/007 |
| 2021/0050748 | A1* | 2/2021 | Wei | H02J 50/80 |
| 2023/0065766 | A1* | 3/2023 | Pei | H02J 7/00712 |
| 2023/0198310 | A1* | 6/2023 | Aldhaher | H02J 50/12 307/104 |

FOREIGN PATENT DOCUMENTS

| | | |
|---|---|---|
| CN | 104426212 A | 3/2015 |
| CN | 104795878 A | 7/2015 |
| CN | 205104920 U | 3/2016 |
| CN | 105790318 A | 7/2016 |
| CN | 106451705 A | 2/2017 |
| CN | 107591852 A | 1/2018 |
| JP | H01189103 A | 7/1989 |
| JP | H1189103 A | 3/1999 |
| JP | 2002354712 A | 12/2002 |
| JP | 2010239769 A | 10/2010 |
| JP | 2013183496 A | 9/2013 |
| JP | 2014060840 A | 4/2014 |
| JP | 2016504902 A | 2/2016 |
| JP | 2017501665 A | 1/2017 |
| KR | 20140077070 A | 6/2014 |
| KR | 20160123526 A | 10/2016 |
| WO | 2015015771 A1 | 2/2015 |

OTHER PUBLICATIONS

Extended European Search Report for EP Application 18920121.3 dated Mar. 4, 2021. (9 pages).
India First Examination Report for IN Application 202017049288 dated May 13, 2021. (5 pages).
Chinese Office Action with English Translation for CN Application 2018800857707 dated Apr. 26, 2023. (20 pages).
Korean Office Action with English Translation for KR Application 1020207033103 dated Apr. 7, 2023. (6 pages).
Korean Office Action with English Translation for KR Application 1020207033103 dated Aug. 22, 2022. (7 pages).
Japanese Decision of Dismissal of Amendment with English Translation for JP Application 2020563920 dated Sep. 2, 2022. (8 pages).
Korean Notice of Final Rejection with English Translation for KR Application 1020207033103 dated Jan. 18, 2023. (4 pages).
Communication pursuant to Article 94(3) EPC for EP Application 18920121.3 dated Jun. 13, 2022. (10 pages).
Japanese Notice of Reasons for Refusal with English Translation for JP Application 2020563920 dated May 24, 2022. (8 pages).
International search report issued in corresponding international application No. PCT/CN2018/088492 dated Mar. 6, 2019.
Japanese Office Action with English Translation for JP Application 2020563920 dated Dec. 21, 2021. (12 pages).
Korean Decision for Appeal against Final Rejection with English Translation for KR Application 1020207033103 dated Aug. 30, 2023. (20 pages).

* cited by examiner

WIRELESS POWER RECEPTION APPARATUS AND MOBILE TERMINAL

CROSS-REFERENCE TO RELATED APPLICATION(S)

This application is a continuation of International Application No. PCT/CN2018/088492, filed on May 25, 2018, the disclosure of which is hereby incorporated by reference in its entirety.

TECHNICAL FIELD

This disclosure relates to the technical field of wireless charging, and more particularly to wireless power reception apparatuses and a mobile terminal.

BACKGROUND

Currently, in the field of charging, devices to-be-charged are usually charged in a wired charging manner.

Take mobile phones as an example. Currently, the mobile phone is charged mainly in a wired charging manner. When the mobile phone needs to be charged, the mobile phone can be coupled with a power supply device via a charging cable (such as a universal serial bus (USB) cable), and through the charging cable, an output power of the power supply device can be delivered to the mobile phone to charge a battery of the mobile phone.

For the device to-be-charged, the charging cable is needed for wired charging. This will result in complicated operations in a charging preparation stage. Therefore, a wireless charging manner is enjoying increasing popularity among consumers. However, a conventional wireless charging manner has poor compatibility.

SUMMARY

In a first aspect, a wireless power reception apparatus is provided. The wireless power reception apparatus includes a coil, a first rectifying unit, a second rectifying unit, a charging unit, and a power supply unit for a wireless receiving chip. The coil includes a first end, a second end, and a tap. The coil defined by the first end and the second end is configured to provide a first voltage, and the coil defined by the first end and the tap is configured to provide a second voltage. The first rectifying unit is coupled with the first end and the second end of the coil. The first rectifying unit has a working voltage which matches a first voltage to adapt to a first wireless charging mode. The second rectifying unit is coupled with the first end and the tap of the coil. The second rectifying unit has a working voltage which matches a second voltage to adapt to a second wireless charging mode. The charging unit is coupled with the first rectifying unit and the second rectifying unit and is configured to select one of the first rectifying unit and the second rectifying unit to charge the battery.

In a second aspect, a wireless power reception apparatus is provided. The wireless power reception apparatus includes a coil, a first switch, a second switch, a rectifying unit, and a charging unit. The coil has a first end, a second end, and a tap. The coil defined by the first end and the second end is configured to provide a first voltage, and the coil defined by the first end and the tap is configured to provide a second voltage. The first switch is coupled with the second end of the coil. The second switch is coupled with the tap of the coil. The rectifying unit is coupled with the first switch and the second switch. The rectifying unit has a working frequency which is able to match with the first voltage to adapt to a first wireless charging mode and match with the second voltage to adapt to a second wireless charging mode. The charging unit is coupled with the rectifying module to charge a battery. The control unit is configured to control the first switch and the second switch.

In a third aspect, a mobile terminal is provided. The mobile terminal includes a battery, a coil, a first rectifying unit, a second rectifying unit, and a charging unit. The coil includes a first end, a second end, and a tap, where the coil defined by the first end and the second end is configured to provide a first voltage, and the coil defined by the first end and the tap is configured to provide a second voltage. The first rectifying unit is coupled with the first end and the second end of the coil, and has a working voltage which matches the first voltage to adapt to a first wireless charging mode. The second rectifying unit is coupled with the first end and the tap of the coil, and has a working voltage which matches the second voltage to adapt to a second wireless charging mode. The charging unit is coupled with the first rectifying unit and the second rectifying unit and configured to select one of the first rectifying unit and the second rectifying unit to charge the battery.

BRIEF DESCRIPTION OF DRAWINGS

The above and/or additional aspects and advantages of implementations will become apparent and easily understood from the following description of implementations in conjunction with the accompanying drawings.

DETAILED DESCRIPTION

In implementations of the disclosure, a device to-be-charged is charged through wireless charging technology. The wireless charging technology does not require a cable for power delivery, which can simplify operations in a charging preparation stage.

According to conventional wireless charging technology, a power supply device (such as an adaptor) is generally coupled with a wireless power supply apparatus (that is, wireless charging transmitting apparatus), such as a wireless charging base, and via the wireless power supply apparatus, an output power of the power supply device is delivered to the device to-be-charged wirelessly (for example, via an electromagnetic signal or an electromagnetic wave) for wireless charging of the device to-be-charged. According to various wireless charging principles, the wireless charging can be in the manner of magnetic coupling (or electromagnetic induction), magnetic resonance, and radio waves. At present, main wireless charging standard includes QI standard, power matters alliance (PMA) standard, and alliance for wireless power (A4WP) standard. Under the QI standard and the PMA standard, magnetic coupling is adopted for wireless charging, and under the A4WP standard, magnetic resonance is adopted for wireless charging.

In the following, a conventional wireless charging manner will be described in connection with FIG. 1.

Figure 1:
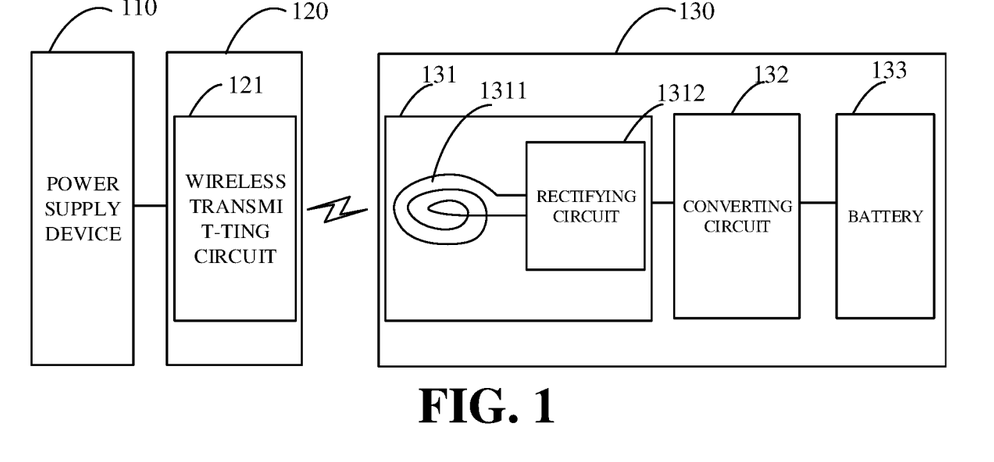
FIG. 1 is an example structural diagram of a conventional wireless charging system.

As illustrated in FIG. 1, a wireless charging system includes a power supply device 110, a wireless power supply apparatus 120, and a device to-be-charged 130. The wireless power supply apparatus 120 can be, for example, a wireless charging base. The device to-be-charged 130 can be, for example, a terminal.

After the power supply device 110 is coupled with the wireless power supply apparatus 120, an output current of the power supply device 110 can be transmitted to the wireless power supply apparatus 120. The wireless power supply apparatus 120 can convert, via an internal wireless transmitting circuit 121, the output current of the power supply device 110 into an electromagnetic signal (or an electromagnetic wave) for transmission. For example, the wireless transmitting circuit 121 can convert the output current of the power supply device 110 into an alternating current (AC) and convert, via a transmitting coil or a transmitting antenna (not illustrated in FIG. 1), the AC into an electromagnetic signal.

The device to-be-charged 130 can receive, via a wireless receiving circuit 131, an electromagnetic signal from the wireless transmitting circuit 121 and convert the electromagnetic signal into an output voltage and an output current of the wireless receiving circuit 131. For example, the wireless receiving circuit 131 may include a receiving coil or receiving antenna 1311 and a rectifying circuit 1312. Via the receiving coil or receiving antenna 1311, an electromagnetic signal transmitted by the wireless transmitting circuit 121 can be converted into an AC, and the AC can be rectified and/or filtered with the rectifying circuit 1312 to be converted into the output voltage and the output current of the wireless receiving circuit 131.

The output voltage of the wireless receiving circuit 131 is however not suitable to be directly applied to a battery 133. Instead, the output voltage of the wireless receiving circuit 131 needs to be converted by a converting circuit 132 of the device to-be-charged 130 to obtain an expected charging voltage and/or an expected charging current of the battery 133 of the device to-be-charged 130.

As an example, the converting circuit 132 can be a charging management unit, such as a charging integrated circuit (IC). When the battery 133 is charged, the converting circuit 132 may be configured to manage a charging voltage and/or a charging current of the battery 133. The converting circuit 132 can have at least one of a voltage feedback function and a current feedback function to achieve management of at least one of a charging voltage and a charging current of the battery 133 respectively. For example, a charging process of the battery can include at least one of a trickle charging stage, a constant-current charging stage, and a constant-voltage charging stage. In the trickle charging stage, the converting circuit 132 can utilize a current feedback function to make current flowing into the battery 133 in the trickle charging stage satisfy the expected charging current of the battery 133 (such as a first charging current). In the constant-current charging stage, the converting circuit 132 can utilize the current feedback function to make current flowing into the battery 133 in the constant-current charging stage satisfy the expected charging current of the battery 133 (such as a second charging current, which may be larger than the first charging current). In the constant-voltage charging stage, the converting circuit 132 can utilize a voltage feedback function to make voltage applied to the battery 133 in the constant-voltage charging stage satisfy the expected charging voltage of the battery 133.

As one example, when the output voltage of the wireless receiving circuit 131 is higher than the expected charging voltage of the battery 133, the converting circuit 132 can be configured to decrease (that is, step down) the output voltage of the wireless receiving circuit 131 to make decreased charging voltage meet requirements on the expected charging voltage of the battery 133. For example, the output voltage of the wireless receiving circuit 131 is constant 5V (volt). When the battery 133 includes one single cell (here, a lithium battery is taken as an example of the cell, and a charging cut-off voltage of a single lithium battery cell is generally 4.2V), the converting circuit 132 (such as a buck circuit) can decrease the output voltage of the wireless receiving circuit 131, such that the decreased charging voltage meets requirements on the expected charging voltage of the battery 133.

As another example, when the output voltage of the wireless receiving circuit 131 is lower than the expected charging voltage of the battery 133, the converting circuit 132 can be configured to increase (that is, step up) the output voltage of the wireless receiving circuit 131 to make increased charging voltage meet requirements on the expected charging voltage of the battery 133. For example, the output voltage of the wireless receiving circuit 131 is a constant 5V. When the battery 133 includes two or more cells coupled in series (here, lithium battery is taken as an example of the cell, and a charging cut-off voltage of a single lithium battery cell is generally 4.2V), the converting circuit 132 (such as a boost circuit) can increase the output voltage of the wireless receiving circuit 131, such that the increased charging voltage meets requirements on the expected charging voltage of the battery 133.

As described above, in conventional wireless charging technology, the wireless receiving circuit 131 is usually provided with the receiving coil or receiving antenna 1311 and the rectifying circuit 1312 to receive the electromagnetic signal transmitted by the wireless transmitting circuit 121, convert the electromagnetic signal into an AC, and rectify and/or filter the AC to output a DC to be applied to the battery 133 for charging. However, since the receiving coil or receiving antenna 1311 and the rectifying circuit 1312 are relatively simple in structure, the device to-be-charged 130 is only applicable to one wireless charging scheme, for example, the device to-be-charged 130 is only applicable to a wireless charging scheme under a conventional QI standard, which results in lack of charging compatibility of the device to-be-charged 130.

Taking the above into consideration, a wireless power reception apparatus is provided. In the wireless power reception apparatus, the receiving coil is provided with at least one tap (or the receiving antenna is provided with at least one in-between position), and at least one corresponding rectifying unit is introduced. With aid of the at least one tap and the at least one corresponding rectifying unit, various wireless charging modes can be provided for the device to-be-charged, such that the device to-be-charged can be compatible with two or more wireless charging schemes. For example, besides the wireless charging scheme under the conventional QI standard, the device to-be-charged can be compatible with a high-voltage wireless charging scheme, which is a QI standard based wireless charging scheme with high voltage and small current. This can effectively improve charging compatibility of the device to-be-charged and thus charging of the device to-be-charged will be more convenient.

The wireless power reception apparatus 200 according to implementations will be detailed below with reference to FIG. 2.

Figure 2:
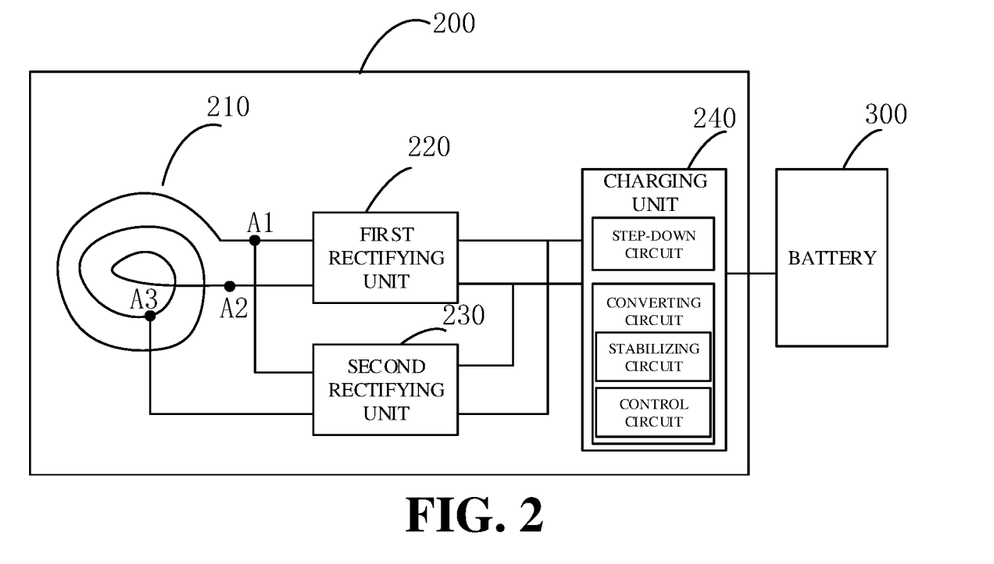
FIG. 2 is a schematic structural diagram of a wireless power reception apparatus according to implementations.

As illustrated in FIG. 2, the wireless power reception apparatus 200 includes a coil 210, a first rectifying unit 220, a second rectifying unit 230, and a charging unit 240.

In some implementations, the coil 210 is configured to convert an electromagnetic signal emitted by the wireless transmitting circuit of the wireless power supply apparatus into alternating current (AC). The coil 210 has a first end A1, a second end A2, and a tap A3. The coil defined by the first end A1 and the second end A2 is configured to provide a first voltage. The coil defined by the first end A1 and the tap A3 is configured to provide a second voltage, which is different from the first voltage. That is to say, when the electromagnetic signal emitted by the wireless power supply device is received at the wireless power reception apparatus 200, the electromagnetic signal is converted by the coil defined by the first end A1 and the second end A2 into a first AC with the first voltage, and converted by the coil defined by the first end A1 and the tap A3 into a second AC with the second voltage, to charge the battery.

It should be noted that, in implementations illustrated in FIG. 2, alternatively, the coil 210 may be replaced with an antenna. The first end A1, the second end A2, and the tap A3 of the coil 210 correspond to three different positions of the antenna respectively, and with aid of the three different positions, ACs falling into different voltage ranges can be obtained. Alternatively, the coil 210 defined by the first end A1 and the second end A2 can work in a first frequency band and the coil 210 defined by the first end A1 and the tap A3 can work in a second frequency band, to adapt to wireless charging schemes in different frequency bands.

In some implementations, the first rectifying unit 220 is coupled with the first end A1 and the second end A2 of the coil 210, and the first rectifying unit 220 has a working voltage which matches the first voltage to adapt to a first wireless charging mode. The second rectifying unit 230 is coupled with the first end A1 and the tap A3 of the coil 210, and the second rectifying unit 230 has a working voltage which matches the second voltage to adapt to a second wireless charging mode. In other words, the wireless power reception apparatus 200 provided herein can be operable with different wireless charging modes, for example, a first wireless charging mode and a second wireless charging mode, where the first wireless charging mode may be the high-voltage wireless charging mode, and the second wireless charging mode may be the wireless charging mode under the conventional QI standard.

In some implementations, the charging unit 240 is coupled with the first rectifying unit 220 and the second rectifying unit 230, to select one of the first rectifying unit 220 and the second rectifying unit 230 to charge a battery 300 of the device to-be-charged, such as a mobile terminal.

For example, the first rectifying unit 220 is configured with respect to the first AC and the second rectifying unit 230 is configured with respect to the second AC. In this way, when the battery 300 is charged in the first wireless charging mode, the control unit 240 controls the first rectifying unit 220 to work, such that the first rectifying unit 220 converts the first AC outputted from the first end A1 and the second end A2 of the coil 210 into a first direct current (DC) to charge the battery 300. When the battery 300 is charged in the second wireless charging mode, the control unit 240 controls the second rectifying unit 230 to work, such that the second rectifying unit 230 converts the second AC outputted from the first end A1 and the tap A3 into a second DC to charge the battery 300. In this way, different wireless charging schemes can be implemented, which is possible to effectively improve charging compatibility and make charging more convenient.

The form of the first rectifying unit 220 and the second rectifying unit 230 is not particularly restricted herein. In some embodiments, the first rectifying unit 220 and the second rectifying unit 230 can each include a rectifying circuit and a filter circuit. The filter circuit is configured to filter the DC outputted by the rectifying circuit to obtain a stable DC. When one of the first rectifying unit 220 and the second rectifying unit 230 works, the other one of the first rectifying unit 220 and the second rectifying unit 230 does not work. In other words, a suitable rectifying unit is selected according to a wireless charging mode currently required, to charge the battery 300, and the other rectifying unit is in a non-working state to prevent the other rectifying unit from damaging subsequent circuits.

It should be noted that, according to implementations, the wireless power reception apparatus 200 does not indiscriminately adopt the first wireless charging mode or the second wireless charging mode to charge the device to-be-charged, that is, the charging unit 240 does not charge the battery 300 randomly with the first rectifying unit 220 or with the second rectifying unit 230. Instead, the charging unit 240 communicates with the wireless power supply apparatus to determine a wireless charging mode currently required.

Figure 3:
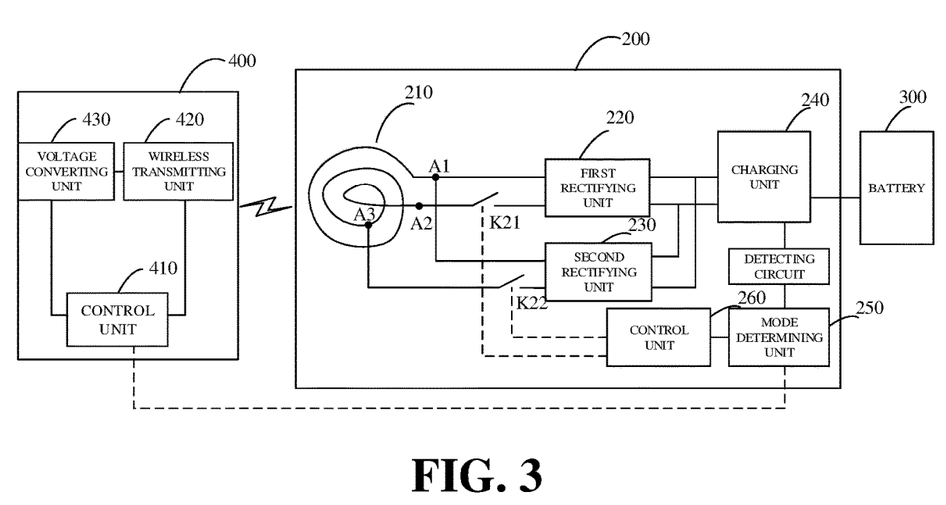
FIG. 3 is a schematic structural diagram of a wireless power reception apparatus according to other implementations.

In some implementations, as illustrated in FIG. 3, the wireless power reception apparatus 200 further include a mode determining unit 250. The mode determining unit 250 is configured to communicate with the wireless power supply apparatus 400 to determine the present wireless charging mode. The mode determining unit 250 may include a first wireless communication unit (not illustrated in FIG. 3). The first wireless communication unit can perform wireless communication with a second wireless communication unit (not illustrated in FIG. 3) of the wireless power supply apparatus 400 to determine the present wireless charging mode and communicates the wireless charging mode to the charging unit 240, such that the charging unit 240 can select, according to the wireless charging mode received, the first rectifying unit 220 or the second rectifying unit 230 to charge the battery 300.

In some examples, wireless communication between the mode determining unit 250 and the wireless power supply apparatus 400 (or between the first wireless communication unit and the second wireless communication unit) may be a two-way wireless communication. In the two-way wireless communication, a recipient is usually required to send a response message to an initiator upon receiving a communication request initiated by the initiator. Under a two-way communication mechanism, communication can be safer. It should be noted that, there is no restriction on which party acts as the initiator or the recipient, that is, any one of two parties (here, the mode determining unit 250 and the wireless power supply apparatus, or the first wireless communication unit and the second wireless communication unit) may act as the initiator or the recipient. In addition, the manner of communication between the recipient and the initiator is not particularly restricted in implementations. For example, wireless communication may be performed based on Bluetooth, wireless fidelity (Wi-Fi), or backscatter modulation (or power load modulation).

In some examples, the charging unit 240 may include a step-down circuit (not illustrated). The step-down circuit is configured to decrease a DC outputted by a rectifying unit (here, the first rectifying unit 220 or the second rectifying unit 230 that is coupled with the charging unit 240) to obtain a first charging voltage and a first charging current, where the first charging voltage and the first charging current may be an expected charging voltage and an expected charging current of the battery 300 to be directly applied to the battery 300 for charging.

In some examples, the charging unit 240 may further include a converting circuit (not illustrated). The converting circuit is configured to conduct voltage control on a DC outputted by the rectifying unit to obtain a second charging voltage and a second charging current to be applied to the battery 300 for charging. The converting circuit may include a circuit for stabilizing voltage ("voltage stabilizing circuit" for short) and a circuit for realizing constant current and constant voltage (CC/CV) ("CC/CV circuit" for short), where the voltage stabilizing circuit is coupled with the rectifying unit(s), and the CC/CV circuit is coupled with the battery 300.

In some examples, when the battery 300 is charged via the converting circuit, the wireless power supply apparatus 400 may charge the wireless power reception apparatus 200 wirelessly in the wireless charging mode under the conventional QI standard. In this situation, the mode determining unit 250 communicates to the charging unit 240 the wireless charging mode under the conventional QI standard, where the wireless charging mode under the conventional QI standard is received from the wireless power supply apparatus 400. The charging unit 240 controls the second rectifying unit 230 to work, so that the second rectifying unit 230 converts a second AC outputted from the first end A1 and the tap A3 of the coil 210 into a second DC. The second DC is converted by the converting circuit and then applied to the battery 300 for charging.

However, during charging of the battery 300 with the converting circuit, for example, when the wireless power supply apparatus 400 outputs a power of 20 W (watt) for charging the battery 300 including one single cell, an input voltage of a wireless transmitting unit 420 is required to be 5V and an input current of the wireless transmitting unit is required to be 4 A (ampere). However, an input current of 4 A will certainly result in heating of the coil and thus reduce charging efficiency. If the step-down circuit is used in charging of the battery 300 including one single cell, on condition that a transmission power of the wireless transmitting unit remains constant (20 W), the input voltage of the wireless transmitting unit 420 can be increased, and accordingly the input current of the wireless transmitting unit 420 can be decreased, thereby reducing heating of the coil and improving charging efficiency. In this case, the wireless charging mode adopted by the wireless power supply apparatus is a high-voltage small-current wireless charging mode, that is, the high-voltage wireless charging mode. Accordingly, the mode determining unit 250 communicates to the charging unit 240 the high-voltage wireless charging mode that is received from the wireless power supply apparatus 400. The charging unit 240 controls the first rectifying unit 220 to work, so that the first rectifying unit 220 converts the first AC outputted from the first end A1 and the second end A2 of the coil 210 into the first DC. The first DC is decreased by the step-down circuit to charge the battery 300.

In some examples, the step-down circuit can be implemented in various manners. For example, the step-down circuit may be a buck circuit or a charge pump. The charge pump may be composed of multiple switch components. Since the amount of heat generated when a current flows through switch components can be relatively small and almost equal to the amount of heat generated when a current flows directly through a wire, by using the charge pump as the step-down circuit, the voltage can be decreased with a relative reduction in heat generation. As an example, the step-down circuit may be a half-voltage circuit. A ratio of an input voltage to an output voltage of the step-down circuit is a constant 2:1 to further reduce heating of the step-down circuit.

In some examples, the wireless power supply apparatus 400 may include a voltage converting unit 430. The voltage converting unit is configured to perform voltage conversion on a current to be provided to the wireless transmitting unit 420 when a voltage of the current to be provided to the wireless transmitting unit 420 does not satisfy preset conditions. A boost factor of the voltage converting unit 430 and a step-down factor of the step-down circuit are set according to parameters such as an output voltage that a power supply device is able to provide, a charging voltage required by the battery 300, etc. The boost factor and the step-down factor may be equal to each other or not, which is not limited herein. As an example, the boost factor and the step-down factor may be set to be equal to each other. For instance, the voltage converting unit 430 may be a voltage doubler circuit configured to double an output voltage of the power supply device. The step-down circuit may be a half-voltage circuit configured to decrease an output voltage of the rectifying unit by half.

In some examples, a ratio of the boost factor of the voltage converting unit 430 to the step-down factor of the step-down circuit is set to be 1:1, such that an output voltage of the step-down circuit and an output current of the step-down circuit are respectively equal to the output voltage of the power supply device and an output current of the power supply device, which is beneficial to simplifying implementation of a control circuit. As an example, a charging current required by the battery 300 is 5 A. When the wireless power supply apparatus 400 is informed by a detecting circuit that the output current of the step-down circuit is 4.5 A, it is necessary to adjust an output power of the power supply device, such that the output current of the step-down circuit reaches 5 A. If the ratio of the boost factor to the step-down factor is not equal to 1:1, when adjusting of the output power of the power supply device, it is necessary to recalculate an adjustment amount of the output power of the power supply device based on a difference between a present output current of the step-down circuit and an expected current. According to implementations, the ratio of the boost factor to the step-down factor is set to be 1:1. In this way, the wireless power reception apparatus 200 only needs to notify a control unit 410 of the wireless power supply apparatus 400 of increasing the output current of the power supply device to 5 A, which simplifies feedback and adjustment manner of a wireless charging path.

In some examples, a charging voltage and/or a charging current outputted by the charging unit 240 can be detected by a detecting circuit (not illustrated) and communicated to the mode determining unit 250, such that the mode determining unit 250 feeds back the charging voltage and/or the charging current outputted by the charging unit 240 to the wireless power supply apparatus 400. As such, the wireless power supply apparatus 400 can adjust a transmission power of a wireless transmitting circuit (that is, adjust the wireless charging mode) according to the charging voltage and/or the charging current fed back by the mode determining unit 250.

In some examples, the wireless power reception apparatus 200 and the wireless power supply apparatus 400 can exchange other information used for adjusting the transmission power of the wireless transmitting unit 420, such as temperature information of the battery 300, information indicative of a peak value or an average value of a voltage and/or a current in a charging circuit including the step-down circuit, power-delivery efficiency information, etc.

For example, the wireless power reception apparatus 200 may send the power-delivery efficiency information to the wireless power supply apparatus 400. The wireless power supply apparatus 400 may be further configured to determine an adjustment rate of the transmission power of the wireless transmitting unit 420 according to the power-delivery efficiency information. If the power-delivery efficiency information indicates that the power-delivery efficiency between the wireless transmitting unit 420 and the coil 210 is low, the wireless power supply apparatus 400 can increase the adjustment rate of the transmission power of the wireless transmitting unit 420, such that the transmission power of the wireless transmitting unit 420 quickly reaches a target transmission power.

For another example, if an output voltage and/or an output current of the rectifying unit has a pulsating waveform, the wireless power reception apparatus 200 can send to the wireless power supply apparatus 400 information indicative of a peak value or an average value of an output voltage and/or an output current in the charging circuit including the step-down circuit. The wireless power supply apparatus 400 can determine whether the peak value or the average value matches a charging voltage and/or a charging current currently required by the battery 300. If the peak value or the average value does not match the charging voltage and/or the charging current currently required by the battery 300, the transmission power of the wireless transmitting unit 420 can be adjusted.

For another example, the wireless power reception apparatus 200 may send the temperature information of the battery 300 to the wireless power supply apparatus 400. When a temperature of the battery 300 is excessively high, the wireless power supply apparatus 400 can reduce the transmission power of the wireless transmitting unit 420 to decrease the output current of a wireless receiving unit 420, thereby reducing the temperature of the battery 300.

In some examples, the wireless power reception apparatus 200 and the wireless power supply apparatus 400 can also exchange other types of communication information. As an example, the wireless power reception apparatus 200 and the wireless power supply apparatus 400 can exchange information for safety protection, abnormality detection, or fault handling, such as the temperature information of the battery 300, information indicative of over-voltage protection or over-current protection, etc., or the power-delivery efficiency information. The power-delivery efficiency information is indicative of the power-delivery efficiency between the wireless transmitting unit 420 and the coil 210 and the power-delivery efficiency between the coil 210 and the rectifying unit.

For example, when the temperature of the battery 300 is excessively high, the wireless power reception apparatus 200 and/or the wireless power supply apparatus 400 can control a charging loop to be in a protection state, such as controlling to stop wireless charging through the charging loop. For another example, after receiving the information indicative of over-voltage protection or over-current protection from the wireless power reception apparatus 200, the wireless power supply apparatus 400 can reduce the transmission power, or control the wireless transmitting unit 420 to stop working. For yet another example, after receiving the power-delivery efficiency information from the wireless power reception apparatus 200, the wireless power supply apparatus 400 can control the wireless transmitting unit 420 to stop working when power-delivery efficiency is lower than a preset threshold. The wireless power supply apparatus 400 can notify a user of such event. For an example, the fact that the power-delivery efficiency is excessively low can be displayed via a display screen, or be indicated by an indicator lamp in order for the user to adjust wireless charging environment.

In some examples, as illustrated in FIG. 3, the wireless power reception apparatus 200 further includes a first switch K21, a second switch K22, and a control unit 260. The first switch K21 is coupled with the first rectifying unit 220, and the second switch K22 is coupled with the second rectifying unit 230. The control unit 260 is configured to control, according to the present wireless charging mode, one of the first switch K21 and second switch K22 to be closed, that is, in an on-state.

After determining a wireless charging mode currently required, the mode determining unit 250 can communicate the wireless charging mode to both the charging unit 240 and the control unit 260. Supposing that the wireless charging mode currently required is the first wireless charging mode, the control unit 260 controls the first switch K21 to be closed, such that the second end A2 of the coil 210 is connected to the first rectifying unit 220. The charging unit 240 controls the first rectifying unit 220 to work, so as to charge the battery 300. At the same time, the control unit 260 controls the second switch K22 to be opened, that is, in an off-state, such that the tap A3 of the coil 210 is disconnected from the second rectifying unit 230. This can effectively prevent the second rectifying unit 230 from working by mistake and therefore avoid adversely affecting subsequent circuits. Supposing that the wireless charging mode currently required is the second wireless charging mode, the control unit 260 controls the second switch K22 to be closed. The charging unit 240 controls the second rectifying unit 230 to work, so as to charge the battery 300. At the same time, the control unit 260 controls the first switch K21 to be opened, to prevent the first rectifying unit 220 from working by mistake and thus avoid adversely affecting subsequent circuits. As such, by controlling the first switch K21 and second switch K22, the first rectifying unit 220 or the second rectifying unit 230 can be prevented from working by mistake, which is possible to avoid adverse influence on subsequent circuits, thereby ensuring safety during working of the wireless power reception apparatus 200.

It should be noted that, the mode determining unit 250 and the control unit 260 may be disposed separately, or may be integrated into the charging unit 240. The charging unit 240 may be a charging management unit and integrated with functions such as control, management, etc. of the whole wireless power reception apparatus 200.

In addition, one or more than one tap A3 of the coil 210 can be provided, and similarly, one or more than one second rectifying unit 230 can be provided, which is not limited herein.

Figure 4:
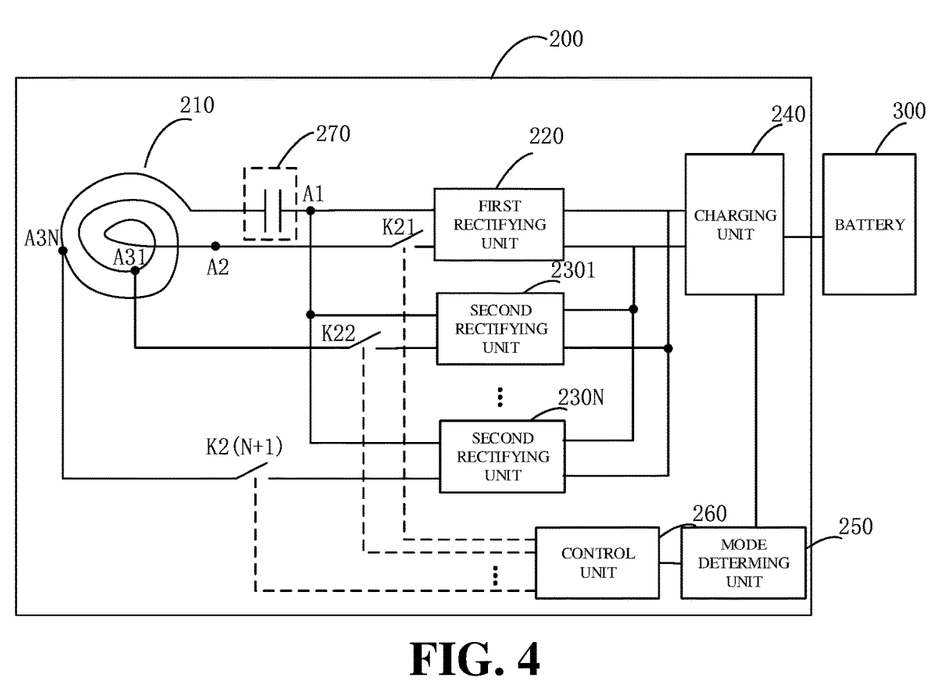
FIG. 4 is a schematic structural diagram of a wireless power reception apparatus according to other implementations.

In some implementations, as illustrated in FIG. 4, more than one tap A3 of the coil 210 is provided, and accordingly more than one second rectifying unit 230 is provided. The coil defined by the first end A1 of the coil 210 and each of the taps (such as A31, ..., and A3N) at different positions has different working voltages. For example, the coil defined by the first end A1 of the coil 210 and a tap A31 is configured to provide the second voltage, ..., and the coil defined by the first end A1 of the coil 210 and a tap A3N is configured to provide an $(N+1)^{th}$ voltage. Accordingly, a second rectifying unit 2301 is coupled with the first end A1 of the coil 210 and the tap A31, and a working voltage of the second rectifying unit 2301 matches the second voltage to adapt to the second wireless charging mode. Similarly, a second rectifying unit 230N is coupled with the first end A1 and the tap A3N of the coil 210, and a working voltage of the second rectifying unit 230N matches the $(N+1)^{th}$ voltage to adapt to an $(N+1)^{th}$ wireless charging mode.

In other words, in implementations illustrated in FIG. 4, the coil 210 includes N taps, and N second rectifying units 230 are introduced (N≥2). The first end A1 and the second end A2 of the coil 210 and the first rectifying unit 220 are configured to be compatible with the first wireless charging mode, such as a high voltage wireless charging mode, the tap A31 and the second rectifying unit 2301 are configured to be compatible with the second wireless charging mode, ..., and the tap A3N and the second rectifying unit 230N are configured to be compatible with the $(N+1)^{th}$ wireless charging mode, such as a QI standard based wireless charging mode. In this way, the wireless power reception apparatus 200 can provide two or more wireless charging modes, such that the device to-be-charged can be compatible with more wireless charging schemes, which makes charging more convenient. It should be noted that, when more than one tap is provided and more than one second rectifying unit 230 is provided, for the charging control process corresponding thereto, reference can be made to the foregoing description, which is not repeated herein.

In other examples, functions of multiple taps and multiple second rectifying units can also be achieved with one tap A3 and one second rectifying unit 230, that is, functions of the structure illustrated in FIG. 4 can be achieved with the structure illustrated in FIG. 3. In this situation, the tap A3 is a non-fixed tap, that is, the number of turns of the coil 210 is adjustable. As such, in different wireless charging modes, the control unit 260 adjusts the position of the tap A3 according to the present wireless charging mode such that the number of turns of the coil 210 defined by the first end A1 and the tap A3 is equal to that corresponding to the present wireless charging mode, and adjusts a working voltage of the second rectifying unit 230 such that the working voltage is suitable for the present wireless charging mode. In this way, requirements of various wireless charging modes can be met with aid of only one tap A3 and one second rectifying unit 230. In addition, compared with a scheme of multiple taps and multiple second rectifying units, the above scheme has advantages of simple structure, small volume, and low cost.

In other words, according to implementations, the tap A3 can be a non-fixed tap, that is, the number of turns of the coil is adjustable. Alternatively, more than one tap can be provided, that is, the number of turns of the coil is fixed. The above two manners can be selectively adopted according to actual needs. In some implementations, as illustrated in FIG. 4, the wireless power reception apparatus 200 further includes a matching unit 270. The matching unit 270 is configured to cooperate with the coil 210 to convert the electromagnetic signal received into AC with different voltages for output.

In some examples, as illustrated in FIG. 4, the matching unit 270 may be arranged before a point of common coupling at an input end of the first rectifying unit 220 and at least one second rectifying unit 230. That is, the first rectifying unit 220 and at least one second rectifying unit 230 share one matching unit 270. The matching unit 270 cooperates with the coil defined by the first end A1 and the second end A2 of the coil 210 to convert an electromagnetic signal into the first AC with the first voltage for output. The matching unit 270 cooperates with the coil defined by the first end A1 and the tap A31 of the coil 210 to convert an electromagnetic signal into the second AC with the second voltage for output. Similarly, the matching unit 270 cooperates with the coil defined by the first end A1 and the tap A3N of the coil 210 to convert an electromagnetic signal into the $(N+1)^{th}$ AC with the $(N+1)^{th}$ voltage for output. As such, it is possible to convert electromagnetic signals into ACs with different voltages with aid of only one single matching unit 270, and thus the wireless power reception apparatus is simple in hardware structure and advantageously has low cost.

It should be noted that, the first rectifying unit 220 and the at least one second rectifying unit 230 share one matching unit 270. In this situation, the matching unit 270 is required to meet different requirements on voltage. Therefore, it may be difficult to design such a matching unit 270. To this end, more than one matching unit 270 can be provided to reduce difficulty in design.

Figure 5:
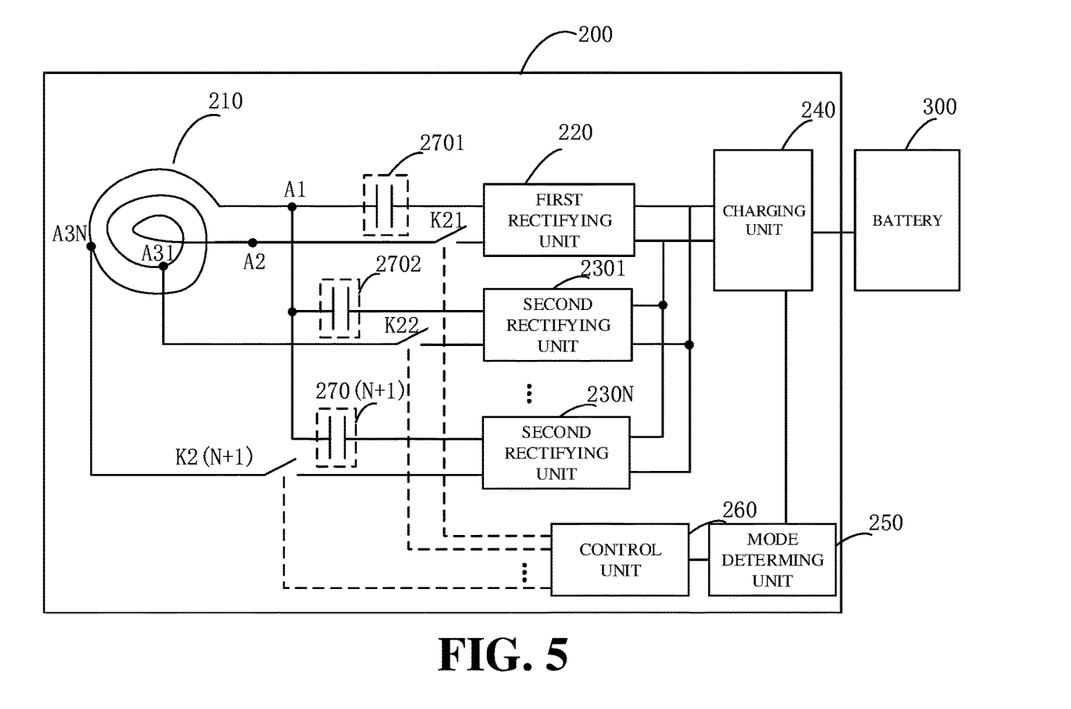
FIG. 5 is a schematic structural diagram of a wireless power reception apparatus according to other implementations.

In other examples, as illustrated in FIG. 5, more than one matching units 270 are provided, where each matching unit 270 is arranged between the first end A1 of the coil 210 and a corresponding rectifying unit. For example, a matching unit 2701 is arranged between the first end A1 of the coil 210 and the first rectifying unit 220 and is configured to cooperate with the coil defined by the first end A1 and the second end A2 of the coil 210 to convert an electromagnetic signal into the first AC with the first voltage for output. A matching unit 2702 is arranged between the first end A1 of the coil 210 and the second rectifying unit 2301 and is configured to cooperate with the coil defined by the first end A1 and the tap A31 of the coil 210 to convert the electromagnetic signal into the second AC with the second voltage for output. A matching unit 270(N+1) is arranged between the first end A1 of the coil 210 and the second rectifying unit 230N and is configured to cooperate with the coil defined by the first end A1 and the tap A3N of the coil 210 to convert the electromagnetic signal into the $(N+1)^{th}$ AC with the $(N+1)^{th}$ voltage for output. As such, with aid of the multiple matching units 270, electromagnetic signals can be converted into ACs with different voltages, which is simple in design.

It should be noted that, there is no restriction on the form of the matching unit 270. In some examples, as illustrated in FIG. 4 or FIG. 5, the matching unit 270 may be implemented as a capacitor.

In the wireless power reception apparatus provided herein, at least one tap is provided in the coil and at least one rectifying unit is provided to provide different wireless charging modes for the device to-be-charged (such as a mobile terminal), such that the device to-be-charged can be compatible with two or more wireless charging schemes, and thus charging of the device to-be-charged can be more convenient.

To solve the above problem, another wireless power reception apparatus is provided. In the wireless power reception apparatus, the receiving coil is provided with at least one tap (or the receiving antenna is provided with at least one in-between position) and at least one corresponding control switch is provided, to provide various wireless charging modes for the device to-be-charged with aid of the at least one tap and the at least one corresponding control switch, such that the device to-be-charged can be compatible with two or more wireless charging schemes. For example, besides a wireless charging scheme under the conventional QI standard, the device to-be-charged can be compatible with a high-voltage wireless charging scheme. This can effectively improve charging compatibility of the device to-be-charged and thus charging of the device to-be-charged will be more convenient.

A wireless power reception apparatus 500 will be detailed below with reference to FIG. 6.

Figure 6:
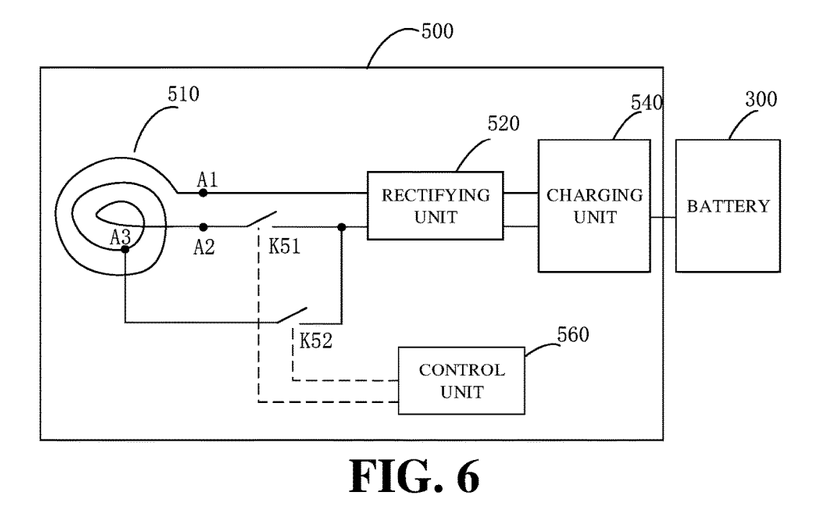
FIG. 6 is a schematic structural diagram of a wireless power reception apparatus according to other implementations.

As illustrated in FIG. 6, the wireless power reception apparatus 500 includes a coil 510, a first switch K51, a second switch K52, a rectifying unit 520, a charging unit 540, and a control unit 560.

The coil 510 has a first end A1, a second end A2, and a tap A3. The coil between the first end A1 and the second end A2 is configured to provide a first voltage, and the coil between the first end A1 and the tap A3 is configured to provide a second voltage. Reference can be made to the foregoing description for details.

The first switch K51 is coupled with the second end A2 of the coil 510 and the rectifying unit 520. The second switch K52 is coupled with the tap A3 of the coil 510 and the rectifying unit 520. The rectifying unit 520 has a working voltage which is able to match the first voltage to adapt to a first wireless charging mode and match the second voltage to adapt to a second wireless charging mode. The charging unit 540 is coupled with the rectifying unit 520 to charge the battery 300. The control unit 560 is configured to control the first switch K51 and the second switch K52. Compared with the structure illustrated in FIG. 2, both the wireless power reception apparatus 200 of FIG. 2 and the wireless power reception apparatus 500 of FIG. 6 can support different wireless charging modes. The wireless power reception apparatus 500 differs from the wireless power reception apparatus 200 in that, only one rectifying unit 520 is needed to support different wireless charging modes.

For example, as illustrated in FIG. 6, when the battery 300 is charged in the first wireless charging mode, the control unit 560 controls the first switch K51 to be closed and controls the second switch K52 to be opened, such that the second end A2 of the coil 510 is connected to the rectifying unit 520. In this situation, the first AC outputted from the first end A1 and the second end A2 of the coil 510 is communicated to the rectifying unit 520. The charging unit 540 controls the rectifying unit 520 to be in a first working state, so that the rectifying unit 520 converts the first AC into the first DC to be applied to the battery 300 for charging. When the battery 300 is charged in the second wireless charging mode, the control unit 560 controls the first switch K51 to be opened and controls the second switch K52 to be closed, such that the tap A3 of the coil 510 is connected to the rectifying unit 520. In this situation, the second AC outputted from the first end A1 and the tap A3 of the coil 510 is communicated to the rectifying unit 520. The charging unit 540 controls the rectifying unit 520 to be in a second working state, so that the rectifying unit 520 converts the second AC into the second DC to be applied to the battery 300 for charging. In this way, with aid of the first switch K51 and the second switch K52, various wireless charging modes can be implemented with only one rectifying unit 520. This can satisfy different wireless charging schemes, thereby effectively improving charging compatibility and making charging more convenient. In addition, compared with implementations illustrated in FIG. 2, the number of rectifying units can be decreased, which is possible to reduce cost.

It should be noted that, according to implementations, the wireless power reception apparatus 500 does not indiscriminately adopt the first wireless charging mode or the second wireless charging mode to charge the device to-be-charged, that is, the control unit 560 does not randomly control the first switch K51 or the second switch K52 to be closed. Instead, the control unit 560 communicates with the wireless power supply apparatus to determine the wireless charging mode currently required.

Figure 7:
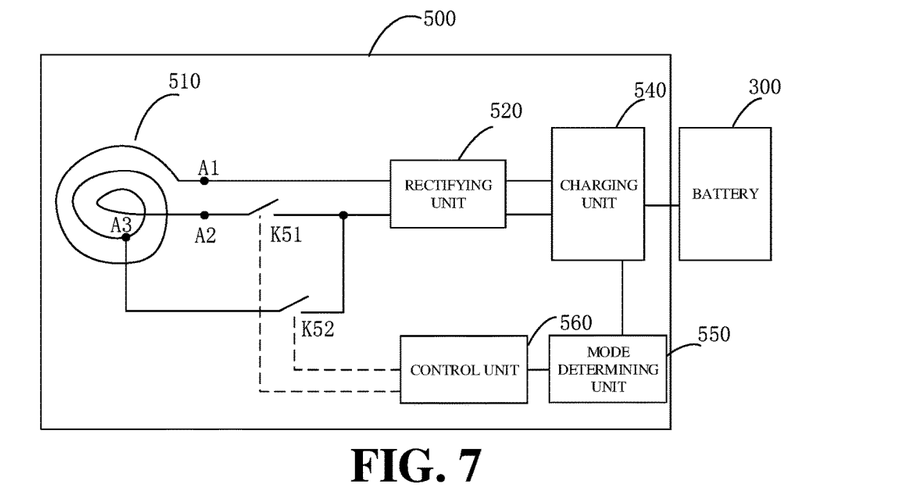
FIG. 7 is a schematic structural diagram of a wireless power reception apparatus according to other implementations.

In some implementations, as illustrated in FIG. 7, the wireless power reception apparatus 500 further includes a mode determining unit 550. The mode determining unit 550 is configured to communicate with the wireless power supply apparatus to determine the present wireless charging mode. For details thereof, reference can be made to the foregoing description, which will not be elaborated again herein.

It should be noted that, the mode determining unit 550 and the control unit 560 can be set separately or can be integrated into the charging unit 540. The charging unit 540 can be a charging management unit, which has functions such as control and management of the whole wireless power reception apparatus 500.

It should be noted that, one or more than one tap A3 of the coil 510 can be provided, and similarly, one or more than one second switch K52 can be provided, which is not limited herein.

Figure 8:
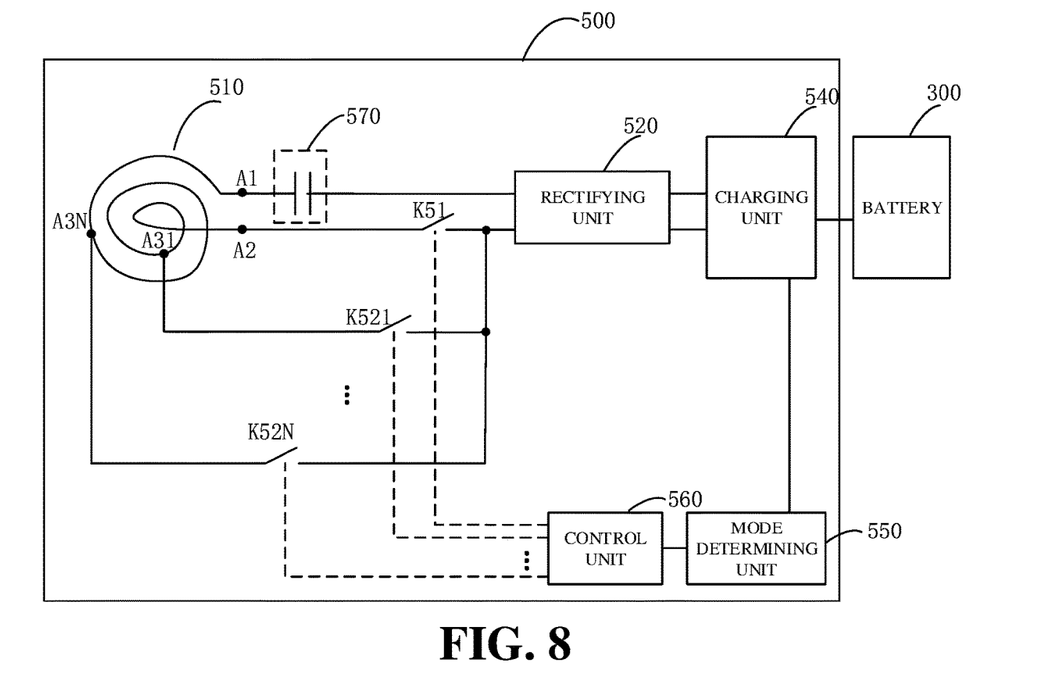
FIG. 8 is a schematic structural diagram of a wireless power reception apparatus according to other implementations.

In some implementations, as illustrated in FIG. 8, more than one tap of the coil 510 is provided, and accordingly more than one second switch is provided. The coil defined by the first end A1 of the coil 510 and each of taps (such as A31, ..., and A3N) at different positions is configured to provide different voltages. For example, the coil defined by the first end A1 of the coil 510 and a tap A31 is configured to provide the second voltage, ..., and the coil defined by the first end A1 of the coil 510 and a tap A3N is configured to provide an $(N+1)^{th}$ voltage. Accordingly, a second switch K521 is coupled with the tap A31 of the coil 510 and the rectifying unit 520. When the second switch K521 is closed, a working voltage of the rectifying unit 520 matches the second voltage to adapt to the second wireless charging mode. Similarly, a second switch K52N is coupled with the tap A3N of the coil 510 and the rectifying unit 520. When the second switch K52N is closed, the working voltage of the rectifying unit 520 matches the $(N+1)^{th}$ voltage to adapt to an $(N+1)^{th}$ wireless charging mode.

In other words, in implementations illustrated in FIG. 8, the coil 510 includes N taps, and N second switches are included (N≥2). The first end A1 and the second end A2 of the coil 510 and the rectifying unit 520 are configured to be compatible with the first wireless charging mode (such as the high-voltage wireless charging mode), the tap A31 and the second switch K521 are configured to be compatible with the second wireless charging mode, ..., and the tap A3N and the second switch K52N are configured to be compatible with the $(N+1)^{th}$ wireless charging mode (such as the QI standard based wireless charging mode). In this way, the wireless power reception apparatus 500 can provide two or more wireless charging modes, such that the device to-be-charged can be compatible with more wireless charging schemes, which makes charging more convenient. It should be noted that, when more than one tap is provided and more than one second switch is provided, for the charging control process corresponding thereto, reference can be made to the foregoing description, which is not repeated herein.

In other examples, functions of multiple taps can also be achieved with one tap A3, that is, functions of the structure illustrated in FIG. 8 can be achieved with the structure illustrated in FIG. 7. In this situation, the tap A3 is a non-fixed tap, that is, the number of turns of the coil 510 is adjustable. As such, in different wireless charging modes, the control unit 560 adjusts the position of the tap A3 according to the present wireless charging mode such that the number of turns of the coil 510 defined by the first end A1 and the tap A3 is equal to that corresponding to the present wireless charging mode, and adjusts the working voltage of the rectifying unit 520 such that the working voltage is suitable for the present wireless charging mode. In this way, requirements of various wireless charging modes can be met with aid of only one tap A3. In addition, compared with a scheme of multiple taps, the above scheme has advantages of simple structure, small volume, and low cost.

In other words, according to implementations, the tap A3 can be a non-fixed tap, that is, the number of turns of the coil is adjustable. Alternatively, more than one tap can be provided, that is, the number of turns of the coil is fixed. The above two manners can be selectively adopted according to actual needs. In some embodiments, as illustrated in FIG. 8, the wireless power reception apparatus 500 may further include a matching unit 570. The matching unit 570 is configured to cooperate with the coil 510 to convert the electromagnetic signal into AC with different voltages for output.

In some examples, as illustrated in FIG. 8, the matching unit 570 may be arranged between the first end A1 of the coil 510 and the rectifying unit 520. The matching unit 570 is configured to cooperate with the coil between the first end A1 and the second end A2 of the coil 510 to convert the electromagnetic signal into a first AC with a first voltage for output. The matching unit 570 is configured to cooperate with the coil between the first end A1 and the tap A31 of the coil 510 to convert the electromagnetic signal into a second AC with a second voltage for output. The matching unit 570 is configured to cooperate with the coil between the first end A1 and the tap A3N of the coil 510 to convert the electromagnetic signal into the $(N+1)^{th}$ AC with the $(N+1)^{th}$ voltage for output. As such, it is possible to convert electromagnetic signals into ACs with different voltages with aid of only one single matching unit 270, and thus the wireless power reception apparatus is simple in hardware structure and advantageously has low cost.

It should be noted that, in the above situation, the matching unit 570 is required to meet different requirements on voltage. Therefore, it may be difficult to design such a matching unit 570. To this end, more than one matching unit 570 can be provided to reduce difficulty in design.

Figure 9:
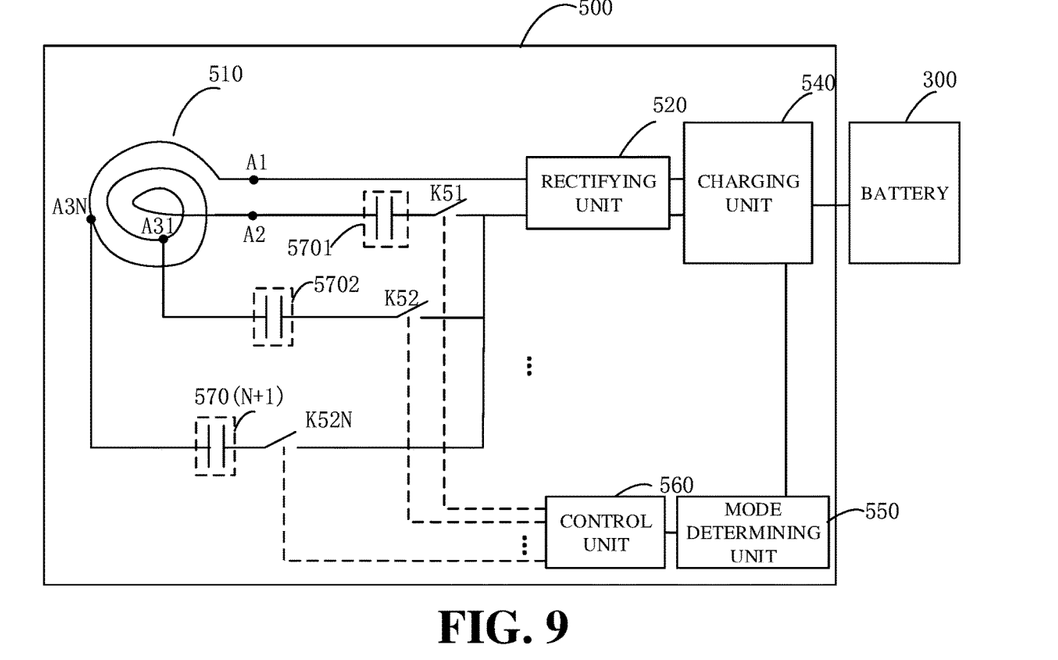
FIG. 9 is a schematic structural diagram of a wireless power reception apparatus according to other implementations.

In other examples, as illustrated in FIG. 9, more than one matching units 570 are provided. The matching unit 5701 is arranged between the first end A1 of the coil 510 and a first switch K51, and is configured to cooperate with the coil between the first end A1 and the second end A2 of the coil 510 to convert the electromagnetic signal into a first AC with a first voltage for output. The matching unit 5702 is arranged between the tap A31 of the coil 510 and a second switch K52, and is configured to cooperate with the coil between the first end A1 and the tap A31 of the coil 510 to convert the electromagnetic signal into a second AC with a second voltage for output. The matching unit 570(N+1) is arranged between the tap A3N of the coil 510 and a second switch K52N, and is configured to cooperate with the coil between the first end A1 and the tap A3N of the coil 510 to convert the electromagnetic signal into the $(N+1)^{th}$ AC with the $(N+1)^{th}$ voltage for output. As such, it is possible to convert electromagnetic signals into ACs with different voltages with aid of multiple matching units 570, and thus the wireless power reception apparatus is simple in design.

In the foregoing embodiment, the matching units can be arranged at the other side of the corresponding switch. There is no restriction on the form of the matching unit 570. In some examples, as illustrated in FIG. 8 or FIG. 9, the matching unit 570 may be implemented as a capacitor.

In the wireless power reception apparatus provided herein, at least one tap is set in the coil and at least one second switch is introduced to provide different wireless charging modes for the device to-be-charged (such as the mobile terminal), such that the device to-be-charged can be compatible with two or more wireless charging schemes, and thus charging of the device to-be-charged will be more convenient.

According to implementations, a mobile terminal is provided. The mobile terminal can be the device to-be-charged 130 illustrated in FIG. 1.

The mobile terminal includes a battery, a coil, a first rectifying unit, a second rectifying unit, and a charging unit. The coil includes a first end, a second end, and a tap, where the coil defined by the first end and the second end is configured to provide a first voltage, and the coil defined by the first end and the tap is configured to provide a second voltage. The first rectifying unit is coupled with the first end and the second end of the coil, and has a working voltage which matches the first voltage to adapt to a first wireless charging mode. The second rectifying unit is coupled with the first end and the tap of the coil, and has a working voltage which matches the second voltage to adapt to a second wireless charging mode. The charging unit is coupled with the first rectifying unit and the second rectifying unit and configured to select one of the first rectifying unit and the second rectifying unit to charge the battery.

The mobile terminal may further include a mode determining unit, which is configured to communicate with a wireless power supply apparatus to determine a present wireless charging mode.

The mobile terminal may further include a first switch, a second switch, and a control unit. The first switch is coupled with the first rectifying unit. The second switch is coupled with the second rectifying unit. The control unit is configured to control one of the first switch and the second switch to be turned on according to the present wireless charging mode.

The mobile terminal may further include a detecting circuit. The detecting circuit is configured to detect an output voltage or output current of the charging unit and provide the output voltage or the output current detected to the mode determining unit, wherein the mode determining unit is configured to transmit the output voltage or the output current detect to the wireless power supply apparatus to adjust the present wireless charging mode.

The mobile terminal may further include a step-down circuit. The step-down circuit is configured to decrease the first voltage received from the first rectifying unit or the second voltage received from the second rectifying unit to obtain a decreased voltage to be applied to the battery.

The mobile terminal may further include a converting circuit. The converting circuit is configured to decrease the first voltage received from the first rectifying unit or the second voltage received from the second rectifying unit to obtain a decreased voltage to be applied to the battery. The converting circuit includes a stabilizing circuit and a control circuit. The stabilizing circuit is coupled with the first rectifying unit and the second rectifying unit. The control circuit is coupled with the battery and configured for constant voltage and constant current control.

For details of the mobile terminal, reference can be made to FIG. 1 to FIG. 9, and will not be repeated herein again to avoid redundancy.

It should be noted that, the device to-be-charged according to implementations can be a terminal. The "terminal" can include but is not limited to a device configured via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or another data connection line or network connection line. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with another communication terminal. A communication terminal configured to communicate via a wireless interface may be called a "wireless communication terminal", a "wireless terminal", and/or a "mobile terminal". Examples of the mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or other electronic devices equipped with radio telephone receiver such as a conventional laptop or a handheld receiver. In addition, the device to-be-charged or terminal according to implementations can further include a power bank. The power bank can be charged by an adaptor to store energy to be provided to other electronic devices.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wireless power reception apparatus, comprising:
   a coil comprising a first end, a second end, and a tap, wherein the coil defined by the first end and the second end is configured to provide a first voltage, and the coil defined by the first end and the tap is configured to provide a second voltage;
   a first rectifying unit coupled with the first end and the second end of the coil, wherein the first rectifying unit has a working voltage that matches the first voltage to adapt to a first wireless charging mode;

a second rectifying unit coupled with the first end and the tap of the coil, wherein the second rectifying unit has a working voltage that matches the second voltage to adapt to a second wireless charging mode;
a charging unit coupled with the first rectifying unit and the second rectifying unit and configured to select one of the first rectifying unit and the second rectifying unit to charge a battery;
a mode determining unit configured to communicate with a wireless power supply apparatus to determine a present wireless charging mode;
a first switch coupled with the first rectifying unit;
a second switch coupled with the second rectifying unit; and
a control unit configured to control one of the first switch and the second switch to be turned on according to the present wireless charging mode.

2. The wireless power reception apparatus of claim 1, wherein more than one tap is provided and more than one second rectifying unit is provided, wherein each second rectifying unit is coupled with the first end and the corresponding tap.

3. The wireless power reception apparatus of claim 2, wherein one of the first rectifying unit and the second rectifying unit is configured to be turned off when the other one of the first rectifying unit and the second rectifying unit is turned on.

4. The wireless power reception apparatus of claim 1, wherein the tap is adjustable in position.

5. The wireless power reception apparatus of claim 1, wherein the coil defined by the first end and the second end is configured to work at a first frequency band, and the coil defined by the first end and the tap is configured to work at a second frequency band that is different from the first frequency band.

6. The wireless power reception apparatus of claim 1, further comprising:
a matching unit arranged before a common input point of the first rectifying unit and the second rectifying unit and coupled with the first rectifying unit and the second rectifying unit, and configured to cooperate with the coil defined by the first end and the second end to convert an electromagnetic signal into a first alternating current (AC) with the first voltage, and cooperate with the coil defined by the first end and the tap to convert the electromagnetic signal into a second alternating current with the second voltage.

7. A wireless power reception apparatus, comprising:
a coil comprising a first end, a second end, and a tap, wherein the coil defined by the first end and the second end is configured to provide a first voltage, and the coil defined by the first end and the tap is configured to provide a second voltage;
a first switch coupled with the second end of the coil;
a second switch coupled with the tap of the coil;
a rectifying unit coupled with the first switch and the second switch, wherein the rectifying unit has a working voltage that is able to match with the first voltage to adapt to a first wireless charging mode and match with the second voltage to adapt to a second wireless charging mode, wherein the first wireless charging mode is a high-voltage wireless charging mode, and the second wireless charging mode is a wireless charging mode under a conventional QI standard;
a charging unit coupled with the rectifying unit to charge a battery; and
a control unit configured to control the first switch and the second switch.

8. The wireless power reception apparatus of claim 7, further comprising:
a mode determining unit configured to communicate with a wireless power supply apparatus to determine a present wireless charging mode.

9. The wireless power reception apparatus of claim 8, wherein the control unit is configured to:
control the first switch to be turned on and control the second switch to be turned off, when the present wireless charging mode is the first wireless charging mode; and
control the first switch to be turned off and control the second switch to be turned on, when the present wireless charging mode is the second wireless charging mode.

10. The wireless power reception apparatus of claim 7, wherein more than one tap is provided and more than one second switch is provided, and each second switch is coupled with a corresponding tap.

11. The wireless power reception apparatus of claim 7, wherein the tap is adjustable in position.

12. The wireless power reception apparatus of claim 7, further comprising a matching unit, wherein the matching unit is coupled between the first end and the rectifying unit and is configured to cooperate with the coil defined by the first end and the second end to convert an electromagnetic signal into a first alternating current (AC) with the first voltage, and cooperate with the coil defined by the first end and the tap to convert the electromagnetic signal into a second AC with the second voltage.

13. A mobile terminal, comprising:
a battery;
a coil comprising a first end, a second end, and a tap, wherein the coil defined by the first end and the second end is configured to provide a first voltage, and the coil defined by the first end and the tap is configured to provide a second voltage;
a first rectifying unit coupled with the first end and the second end of the coil, wherein the first rectifying unit has a working voltage that matches the first voltage to adapt to a first wireless charging mode;
a second rectifying unit coupled with the first end and the tap of the coil, wherein the second rectifying unit has a working voltage that matches the second voltage to adapt to a second wireless charging mode;
a charging unit coupled with the first rectifying unit and the second rectifying unit and configured to select one of the first rectifying unit and the second rectifying unit to charge the battery;
a mode determining unit configured to communicate with a wireless power supply apparatus to determine a present wireless charging mode;
a first switch coupled with the first rectifying unit;
a second switch coupled with the second rectifying unit; and
a control unit configured to control one of the first switch and the second switch to be turned on according to the present wireless charging mode.

14. The mobile terminal of claim 13, further comprising:
a detecting circuit configured to detect an output voltage or output current of the charging unit and provide the output voltage or the output current detected to the mode determining unit, wherein the mode determining unit is configured to transmit the output voltage or the output current detected to the wireless power supply apparatus to adjust the present wireless charging mode.

15. The mobile terminal of claim 13, wherein the charging unit comprises a step-down circuit, which is configured to decrease the first voltage received from the first rectifying unit or the second voltage received from the second rectifying unit to obtain a decreased voltage to be applied to the battery.

16. The mobile terminal of claim 13, wherein the charging unit comprises a converting circuit configured to perform voltage control on the first voltage received from the first rectifying unit or the second voltage received from the second rectifying unit, wherein the converting circuit comprises:
   a stabilizing circuit coupled with the first rectifying unit and the second rectifying unit; and
   a control circuit coupled with the battery and configured for constant voltage and constant current control.

* * * * *